June 4, 1929. A. M. LOFLAND 1,715,610
DUAL PNEUMATIC WHEEL
Filed May 1, 1926  3 Sheets-Sheet 1
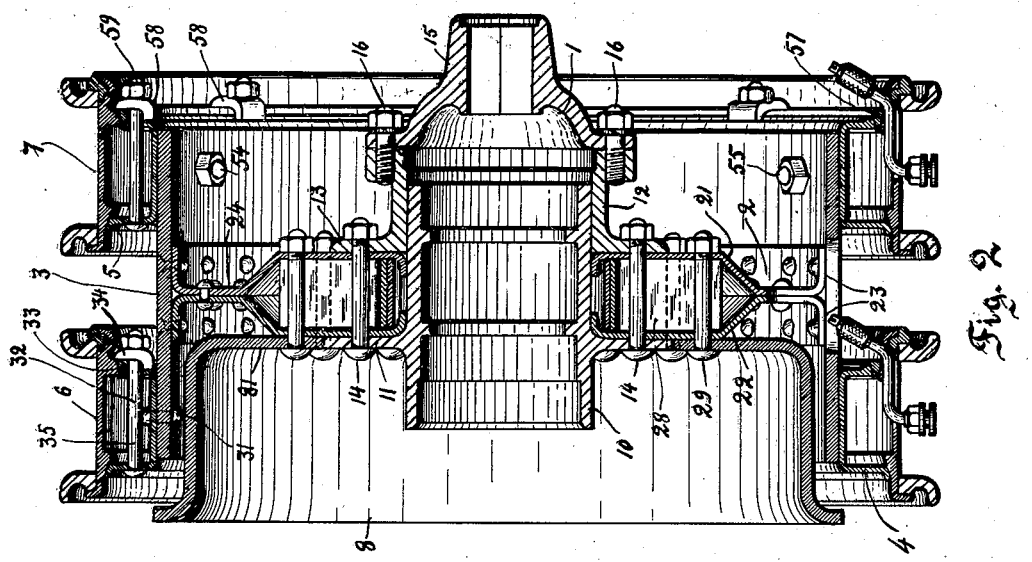
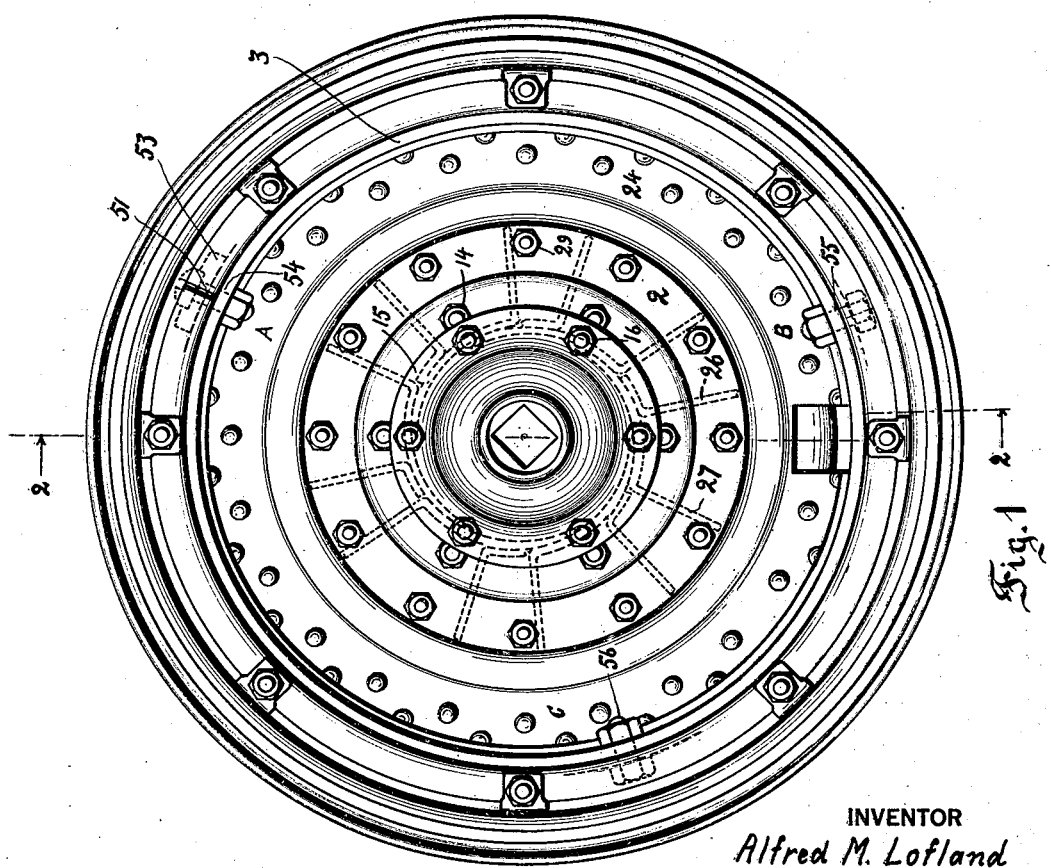
INVENTOR
Alfred M. Lofland
BY
Bohleber & Ledbetter
ATTORNEYS June 4, 1929.  A. M. LOFLAND  1,715,610
DUAL PNEUMATIC WHEEL
Filed May 1, 1926    3 Sheets-Sheet 2

INVENTOR
Alfred M. Lofland
BY
Bohleber & Ledbetter
ATTORNEYS

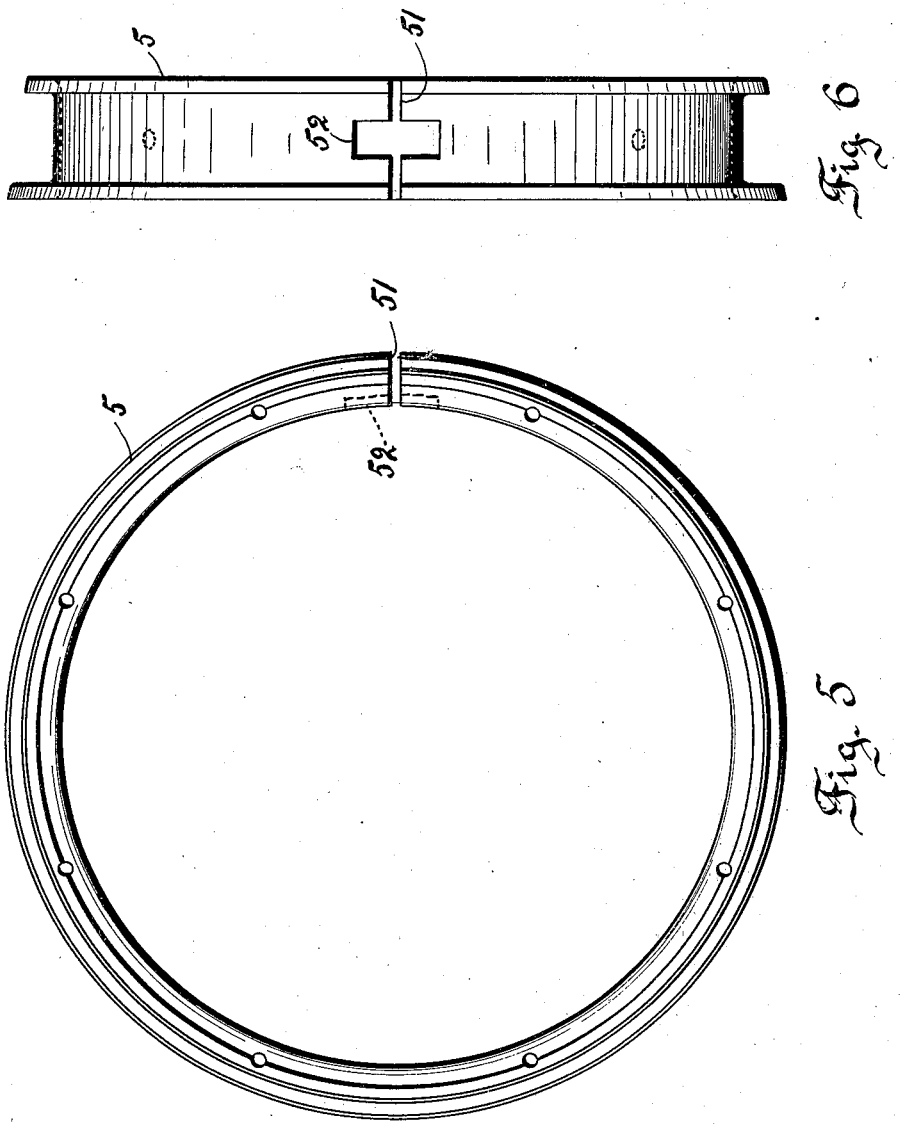

Patented June 4, 1929.

1,715,610

UNITED STATES PATENT OFFICE.

ALFRED M. LOFLAND, OF LEBANON, INDIANA.

DUAL PNEUMATIC WHEEL.

Application filed May 1, 1926. Serial No. 105,911.

This invention relates to a construction for facilitating the mounting and demounting of rims on wheels of the class described and contemplates a construction which shall be not only simple, reliable and foolproof and which shall allow of quick mounting and demounting of rims, but which will at the same time absorb and prevent lost motion between the rim and the master felloe member thereby permitting the use of rims and master felloe bands which vary more or less from their prescribed diameters.

More specifically, it contemplates the use of a standard felloe member, modified from standard practice by being split, and so constructed, arranged and secured in position, that the normal operations of mounting a standard rim thereon will cause the split felloe to adjust itself circumferentially to embrace snugly the master felloe band, and to compensate for, absorb and prevent any lost motion which might otherwise exist between the rim, the felloe, and the master felloe band.

It is an object of this invention to provide a wheel adapted to carry two tires and from which both tires may be removed and replaced with a minimum of time and effort.

It is a further object of this invention to provide a wheel of the class described which will carry standard tires and rims without changes of any sort to the tires or to the rims.

It is a further object of this invention to provide a wheel of the class described in which the rim and tire mounting and demounting operations shall be practically foolproof so that the tire change may be easily made by relatively unskilled labor.

It is a further object of this invention to provide a means of mounting a rim upon the wheel which shall compensate for differences in size of the rims and the felloe band and which will absorb and prevent lost motion which would otherwise exist.

It is a further object of this invention to provide such a lost motion absorbing system which is caused to function by the normal operations of mounting a standard rim upon a standard felloe.

Still other objects of this invention will be apparent from the specification.

My invention will best be understood both as to its underlying principles and as to its practical application by reference to the specification and the accompanying drawings in which;

Figure 1 is a side elevation of a wheel provided with a rim mounted thereon in accordance with my invention.

Figure 2 is a sectional elevation thereof on lines 2—2 of Figure 1.

Figure 5 is a side elevation of a split felloe member according to my invention; and Figure 6 is a front elevation of the same.

Figure 4:
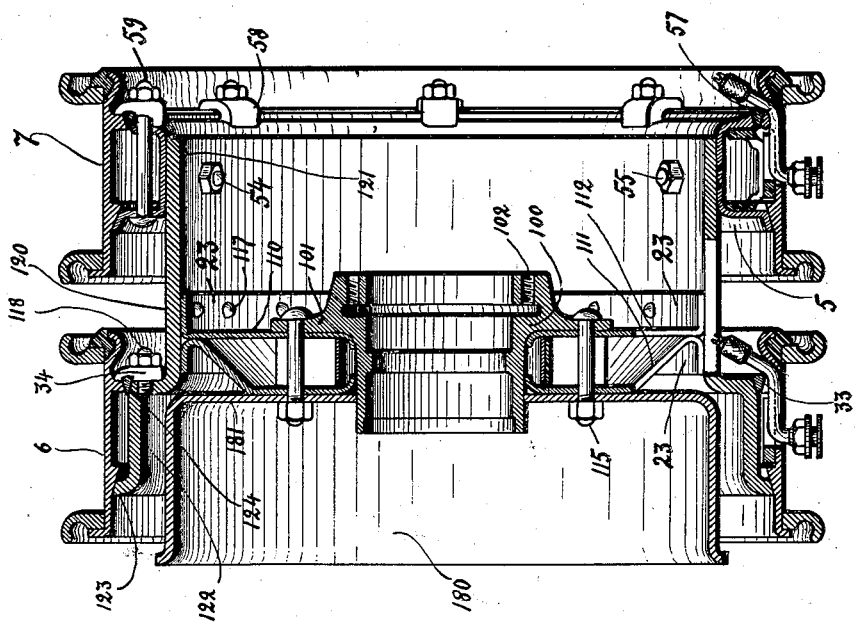
Figure 4 is a sectional elevation thereof along the lines 4—4 of Figure 3.

Referring now particularly to Figure 2 it will be seen that the wheel comprises a hub assembly designated generically as 1, a web assembly 2 and master felloe member 3 carrying felloe members 4 and 5 which carry and support rims 6 and 7 which are equipped with any suitable tire (not shown).

Hub member 1 comprises for example tubular member 10 having formed thereon an annular flange 11 for engagement with web member 2 and may be formed internally with any suitable configuration to enable it to engage with an axle or bearing surfaces. For securing members 10 and 2 firmly in their proper relative position there may be provided tubular member 12 adapted to fit over member 10 as shown and having thereon an annular flange 13 for engagement with web member 2. The hub and web assembly is firmly secured in position as for example by means of bolts 14 passing through flange members 11 and 13 and gripping between them the web member 2. A suitable hub cap 15 is also provided and is secured in position in any suitable manner such as for example by means of bolts 16.

Referring now to the web member designated generically as 2, it will be noted that this member comprises a pair of plates 21 and 22 formed substantially as shown, as for example by stamping, so as to provide a cylindrical surface 23 and annular abutting portions 24, and a spaced portion adapted to contain reinforcing members 26 and 27. By referring to Figure 1 it will be seen that members 26 and 27 are shown as strip material, bent to provide an inner circumferential portion and an outer radial portion. It will also be noted that while the radial portion of each is substantially identical in length the circumferential portion of member 27 is relatively longer than that of members 26. When these members are assembled together alternately as shown and fastened securely together by any suitable means such as rivets (not shown) or by welding there is provided a reinforcing member of relatively great strength and light weight.

This member designated generically as 28 is positioned between plates 21 and 22 and held therein by bolts 14 and 29. A suitable brake drum such as that shown at 8 may be attached by providing it with a radial flange portion such as 81 adapted to engage web member 2 and to be held in position by bolts 29. The construction just described is substantially the same as the arrangements disclosed and claimed in U. S. Letters Patent 1,412,123 of April 11, 1922 granted on an application filed by me.

Master felloe member 3 is preferably but not necessarily formed in a single piece of material in the shape of a cylinder and is secured to web member 2 in any suitable way but preferably by riveting to the cylindrical faces 23 of the plate members 21 and 22. If desired a small section of material may be cut out or an opening formed in any suitable way to permit reception of the valve stem of the inner tire and for permitting ready access thereto.

Inner felloe member 4, which may be standard and readily obtainable felloe, such for instance as standard Firestone steel felloe, is mounted upon master felloe band 3 and is secured in position by any suitable means such as rivets 31. It is of course never necessary to remove this felloe for the purpose of changing tires and the like and it is therefore not necessary to secure it in position demountably. This felloe member 4 will accommodate any standard rim of the type designed to fit therewith such for example as Firestone rim shown at 6 and held in position by means of wedge ring 33, clamps 34 and bolts 35. As the specific construction of this felloe member 4, rim 6 and the various rings, clamps, etc., for securing the rim to the felloe are per se not my invention but are standard elements well known in the art, they are not described in detail.

Referring now to felloe member 5, that is, the outer felloe, it will be seen that its outside diameter is considerably greater than the inside diameter of the rim 6. In order to remove the inner rim 6 it is necessary to first remove not only rim 7 but also outer felloe member 5. For this reason felloe member 5 must be secured to master felloe band 2 in a manner which will possess sufficient strength and rigidity for the purpose but which nevertheless will permit of rapid demounting of the felloe member 5 from master felloe band 2. Also, as master felloe band 2 and the rim 7 are apt to vary slightly from their specified diameters means must be provided for absorbing and preventing lost motion between the rim 7 and master felloe band 2.

For the purpose of providing an arrangement suitable for this purpose felloe member 5 is split as shown at 51 in Figures 1, 5 and 6 and a rectangular slot is provided in the ends as shown at 52. A block or lug 53 of the proper width and depth to engage in this slot 52 is provided and it is preferably but not necessarily formed to the curvature of the master felloe band 2. This block 53 is secured to master felloe band 2 by a suitable bolt 54 fastened through the said block and said master felloe band. For convenience of reference the point at which bolt 54 is placed will be termed point A. At points B and C each approximately 135° from point A are provided bolts 55 and 56. Both master felloe band 2 and felloe member 5 are provided with holes for these bolts with just enough clearance to insure a proper fit at all times.

To mount the rim 7 either with or without its tire, felloe member 5 is placed in position, bolts 55 and 56 are passed through felloe member 5 and master felloe band 2 and the nuts placed thereon and run down and tightened. Lug or block 53 is placed in position in slot 52 and secured by means of bolt 51, passing through master felloe 2, and its associated nut. It will be noted at this point that block 53 while it restrains the two ends of felloe member 5 from movement in an axial direction does not interfere with the movement of the two ends toward or away from each other. With this construction it is possible to obtain a snug fit between felloe member 5 and master felloe band 2 even though these two members vary somewhat from their theoretical size. This is done as follows: The wedge ring 57 is inserted and forced into position by means of clamps 58 which in turn are forced home by means of bolts 59 and their associated nuts. As wedge ring 57 moves inwardly rim 7 will be forced axially inwardly and the wedge surfaces of rim 7 will force split felloe 5 to contract circumferentially. As the felloe member 5 is rigidly secured at points B and C, the movement will be taken up at point A; that is, as nuts 59 are drawn up to force home wedge ring 57, the ends of the felloe member 5 will creep closer together at A and grip more tightly master felloe band 2 and the tighter the nuts 59 are set the tighter will be this fit. Since the rim 7 and master felloe band 2 are endless pieces circumferentially, the split felloe member 5, acting under the force of wedge ring 54 and the wedge shaped surface of rim 7 will adjust itself so as to take up and prevent all lost motion between the rim 7 and master felloe band 2.

In order to remove rim 7, to make a tire change, or for any other purpose, it is only necessary to loosen the nuts from bolts 59 releasing the clamps 58 and thereby the wedge ring 57. When this is done the rim 7 may be removed from the felloe. If it is desired to remove rim 6 however, the split felloe numbered 5 must be removed as well as the rim 7. This is accomplished by removing the rim 7 as above described and by simply removing bolts 54, 55 and 56 and lug 53. Split felloe member 5 may then be drawn outwardly until clear of master felloe band 2. This renders accessible the nuts of bolts 35 holding clamps 34 and thereby the wedge ring 33. By removing these nuts, clamps 34 and wedge ring 33 the rim 6 may be drawn outward and off. It will be noted that the entire operation of removing the outer and inner rims and replacing them is one of great simplicity, and one in which the successive steps to be performed are self evident, so that the replacing of the inner rim, for instance, may be readily and quickly done by the average truck or bus driver in a minimum of time and with a minimum possibility of mistake.

Figure 3:
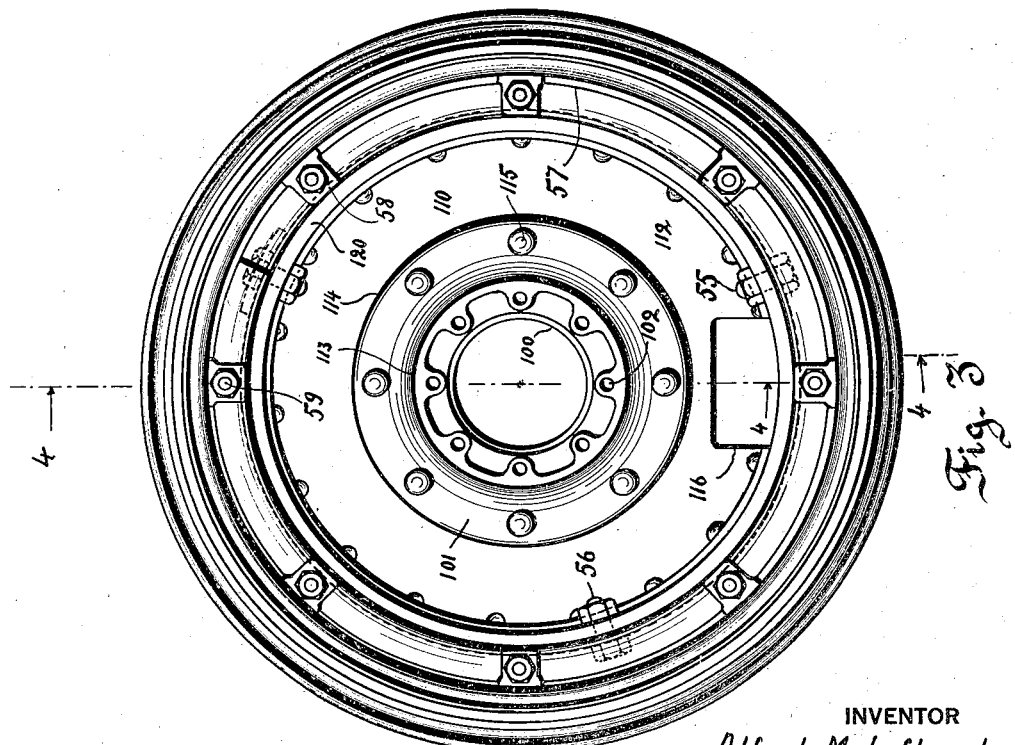
Figure 3 is a side elevation of a modified form of wheel provided with a rim mounted thereon according to my invention.

Referring now to Figures 3 and 4 I have shown my invention as adapted for use with smaller rims and tires than those shown in Figures 1 and 2 and as applied to a wheel of slightly different construction. Hub member 100 is shown in this instance as being constructed of a single piece properly formed on the inside for engagement with axle or bearing surfaces and provided with an annular flange member 101 for attachment to the web member and provided with means for securing a hub cap such as threaded holes 102. Web member 110 in this instance is formed of two plates 111 and 112 each of which is provided with a circumferential surface 23 as shown in Figures 1 and 2 for engagement with master felloe band 120. Only the member 111 however, in this instance is dished to provide space for reinforcing members 113 and 114. As these construction and function of these members are substantially identical with those of members 26 and 27 shown in Figures 1 and 2, it is not believed necessary to go into detail in describing them.

Web member 110 with reinforcing members 113 and 114 are secured in position with respect to each other and to hub member 100 by means of bolts 115, and the circumferential surfaces 23 are secured to the inner side of felloe member 120 by suitable means such for example as rivets 117. It is to be noted that in this case master felloe band 120 is not a plain cylindrical surface, as is the case in Figures 1 and 2, but is formed with portions 121 and 122 of different diameters as shown, and the portion carrying the inner tire is formed to provide wedge surfaces 123 and 124 corresponding to the shape of the felloe upon which the rim is designed to fit, and is also provided with suitable means for securing the rim 6 in position such as wedge ring 33, clamps 34 and bolts 118. This construction permits the inner rim to be mounted directly on the master felloe 121. The brake drum 180 may be attached to web member 111 by any suitable means such for instance as annular flange member 181 secured by bolts 115. Split felloe member 5 is attached to master felloe band 120 as in Figures 1 and 2, that is by means of three bolts 54, 55 and 56 and by lug or block 53. The method of mounting and demounting both the inner and outer rims is substantially identical with that already described.

It will be seen that I have provided a construction which is simple, positive, reliable and inexpensive, and one which permits of mounting and demounting either inner or outer rims with a minimum of time and with a minimum possibility of mistake, and while I have shown and described the preferred form of my invention it will be clear that modifications and changes may be made without departing form the spirit and scope of my invention as will be understood by those skilled in the art.

Having described my invention, in such manner that those skilled in the art may practice it and obtain the benefits thereof, I declare that what I claim is:

1. In a dual demountable rim wheel, the combination of master felloe band adapted to carry a pair of rims, an inner-rim engaging surface associated with said master felloe band, an outer-rim engaging surface comprising a split felloe member, having one end slotted circumferentially, and means for detachably securing said split felloe member to said master felloe band, said means comprising means for locking one point of said split felloe member to said master felloe band, and a lug secured to said master felloe band for engaging the slot in said split felloe band to prevent relative movement of said split felloe and said master felloe band except in a circumferential direction.

2. In a demountable rim wheel adapted to carry a pair of rims secured in position by wedge rings and clamps, the combination of a master felloe band, a rim-engaging surface comprising a split felloe having registering longitudinal slots in the ends, means for securing said felloe to said master felloe band, at a point, and means for preventing axial movement between the ends of said felloe and said master felloe band comprising a lug mounted on said master felloe band, adapted to engage the slots in said felloe ends, whereby said split felloe is circumferentially contracted to fit snugly on said master felloe band, under the action of said wedge ring when driven home by said clamps to secure a rim in position.

3. In a demountable rim wheel adapted to carry a pair of rims secured in position by wedge rings and clamps the combination of a master felloe band, a rim-engaging surface comprising a split felloe having registering longitudinal slots in the ends, means for securing said felloe to said master felloe band at a pair of points remote from the ends of said felloe and means for preventing axial movement between the ends of said felloe and said master felloe band comprising a lug mounted on said master felloe band adapted to engage the slots in said felloe ends whereby said split felloe is circumferentially contracted to fit snugly on said master felloe band, under the action of said wedge ring when driven home by said clamps to secure a rim in position.

4. In a demountable rim wheel adapted to carry a pair of rims secured in position by wedge rings and clamps the combination of a master felloe band, a rim-engaging surface comprising a split felloe having registering longitudinal slots in the ends, means for securing said felloe to said master felloe band at a pair of points remote from the ends of said felloe and symmetrical with respect thereto, and means for preventing axial movement between the ends of said felloe and said master felloe band comprising a lug mounted on said master felloe band adapted to engage the slots in said felloe ends whereby said split felloe is circumferentially contracted to fit snugly on said master felloe band, under the action of said wedge ring when driven home by said clamps to secure a rim in position.

5. In a dual demountable rim wheel, the combination of master felloe band adapted to carry a pair of rims, an inner-rim engaging surface associated with said master felloe band, an outer-rim engaging surface comprising a split felloe member, having one end slotted circumferentially, and means for detachably securing said split felloe member to said master felloe band, said means comprising means for locking one point of said split felloe member to said master felloe band, and a lug upon one of said felloe bands for engaging the slot in said split felloe band to prevent relative movement of said split felloe and said master felloe band except in a circumferential direction.

6. In a dual demountable rim wheel, the combination of a master felloe band adapted to carry a pair of rims, an inner-rim engaging surface associated with said master felloe band, an outer-rim engaging surface comprising a split felloe member, having one end slotted circumferentially, and means for detachably securing said split felloe member to said master felloe band, said means comprising means for locking one point of said split felloe member to said master felloe band bolts spaced therefrom passing through the master felloe band and split felloe band, having elongated clearance openings through one of the felloe members, and a lug upon one of said felloe bands for engaging the slot in said split felloe band to prevent relative movement of said split felloe and said master felloe band except in a circumferential direction.

In testimony whereof, I have hereunto set my hand this 28th day of April, 1926.

A. M. LOFLAND.